United States Patent [19]

Spada et al.

[11] Patent Number: 5,564,556
[45] Date of Patent: Oct. 15, 1996

[54] BELT CONVEYOR DEVICE, FOR GROUPS OF DELICATE ROD-SHAPED OBJECTS, ESPECIALLY IN CIGARETTE PACKAGING MACHINES

[75] Inventors: Valter Spada, Marzabotto; Giuseppe Tosi, Modena, both of Italy

[73] Assignee: SABIB S.p.A., Bologna, Italy

[21] Appl. No.: 388,418

[22] Filed: Feb. 14, 1995

[30] Foreign Application Priority Data

Feb. 16, 1994 [IT] Italy ................... GE94A0017

[51] Int. Cl.$^6$ ................... B65G 47/38
[52] U.S. Cl. ................... 198/803.13
[58] Field of Search ................... 198/418.2, 803.10, 198/803.13, 837, 841, 811

[56] References Cited

U.S. PATENT DOCUMENTS

| | | | |
|---|---|---|---|
| 1,647,265 | 11/1927 | Bronander. | |
| 2,639,025 | 5/1953 | Schmitt | 198/803.13 X |
| 2,953,240 | 9/1960 | Nigrelli et al. | 198/803.13 |
| 3,106,282 | 10/1963 | Schmermund. | |
| 3,245,518 | 4/1966 | Reibel et al. | 198/803.13 X |
| 3,288,271 | 11/1966 | Burford | 198/803.13 X |
| 3,470,995 | 10/1969 | Kuhnle et al. | 198/803.13 |

FOREIGN PATENT DOCUMENTS

1475759  2/1967  France.

*Primary Examiner*—James R. Bidwell
*Attorney, Agent, or Firm*—Larson and Taylor

[57] ABSTRACT

A belt conveyor device for groups of delicate rod-shaped objects, especially in cigarette packaging machines, which device includes a continuous conveyor belt (3) travelling around pulleys (4, 5), at least one of which is driven, and attached to whose outer face are a plurality of conveyor housings (6) each for one group of delicate rod-shaped objects (S, S', S"), housing (6) are equidistant form each other and carried stepwise in succession from a loading station to an unloading station, these stations being situated near two opposite ends of the conveyor belt (3). The conveyor housings (6) consist of two separate and mutually complementary parts (106, 206) divided at at least one plane transverse to the plane defined by the conveyor belt (3) and transverse to the direction of advance of the conveyor belt (3), each housing part (106) being attached firmly to the conveyor belt (3) independently of the other associated housing part (206).

27 Claims, 5 Drawing Sheets

BELT CONVEYOR DEVICE, FOR GROUPS OF DELICATE ROD-SHAPED OBJECTS, ESPECIALLY IN CIGARETTE PACKAGING MACHINES

The invention relates to a belt conveyor device for groups of delicate rod-shaped objects, especially in cigarette packaging machines, which device comprises a continuous conveyor belt travelling around pulleys, at least one of which is driven, and attached to whose outer face are a plurality of conveyor housings, each for one group of delicate rod-shaped objects, which housings are equidistant from each other and carried stepwise in succession from a loading station to an unloading station, these stations being situated near the two opposite ends of the conveyor belt.

At present, especially in cigarette packaging machines, the cigarettes are taken from a feed hopper, in which they are placed loose, and fed to a conveyor belt fitted with a plurality of housing. The feeding of the cigarettes from the hopper to the housings enables groups of cigarettes to be formed in each housing in the same arrangement as the cigarettes will have in the finished packet. The ordered groups of cigarettes are then conveyed to a discharge station where they are transferred to other packaging mechanisms which generally form the packet by wrapping the various layers of packaging material around individual ordered groups of cigarettes.

In order to form the ordered groups of cigarettes, the feed hopper has three outlets located side by side in the direction in which the conveyor belt runs and at which a row of cigarettes made up of a predetermined number of cigarettes lying side by side is formed. Each row of cigarettes at the three outlets of the hopper is situated at a different level in order that each successive row of cigarettes fed into any particular housing of the conveyor device is laid on top of the previous row. Each housing is advanced in steps whose length is equal to the distance between the mouths of the feed hopper. The housings generally consist of rigid tubular elements of approximately rectangular section and their axis is perpendicular to the direction of advance of the conveyor belt, so that the cigarettes are inserted axially into them. In order to allow the conveyor belt to travel around the pulleys, the housings are attached to the conveyor belt only along an intermediate line of the housings at right angles to the belt. While on the one hand this kind of attachment efficiently allows the conveyor belt to bend around the end pulleys by enabling the basically rigid housings to make a tangent at the line of attachment to the conveyor belt, it does on the other hand, in combination with the high speed of advance and with the continual accelerations and decelerations of the stepwise advancing, allow the housings to oscillate about the line of their attachment to the belt, particularly around the end pulleys. This oscillating greatly shortens the life of the conveyor belt and also gradually weakens the housing attachments, leading to problems in their centering. The problem is much greater when, as is usually the case, the housings are attached to the belt by clamping the two said parts with through screws and nuts. In this case the oscillating of the housings gradually enlarges the holes through which the screws pass and so damages the belt and weakens the attachment itself. The oscillating of the housings also affects the regularity of the drive motion of the conveyor device.

The object of the invention is therefore to provide a conveyor device of the kind described at the outset, in which, by comparatively simple and inexpensive means, the mentioned problems are eliminated, while at the same time the life of the conveyor device is increased, maintenance is reduced or made quicker, and the operating speed of the device is made faster.

The invention achieves the above objects in the form of a conveyor device of the kind described at the outset, in which the conveyor housings consist of two separate and mutually complementary parts divided at at least one plane transverse to the plane defined by the conveyor belt and transverse to the direction of advance of the conveyor belt, each housing part being attached firmly to the conveyor belt independently of the other associated housing part.

Each housing part is attached preferably to the belt along a single line transverse to the latter, and especially at only two points, and on said line and located in the lateral peripheral parts of the belt, in such a way as to allow a certain positioning of the housings at a tangent to the conveyor belt around the end pulleys.

By this means the oscillating effect of the conveyor housings and the problems caused thereby are reduced to a very low and negligible level. This is because both the lever arm projecting beyond the line of attachment and the oscillating mass fastened to the belt along said line or at the two said points only on this line are approximately halved or reduced by approximately said order of magnitude.

In an improved version, the irregularities in the oscillating stepwise advancing motion of the conveyor belt, and hence the undue stresses on the latter, are further reduced by synchronizing the drive of the two end pulleys. This makes it possible to avoid an effect of elastic tensile stressing of the conveyor belt which must necessarily accelerate and decelerate the otherwise non-driven end pulley as it propels it.

Moreover, in order to reduce frictional heating of the belt and so extend its life, it is possible to have the belt run along an essentially continuous guide, on an air cushion. The guide can be provided with lateral ribs which support the lateral peripheral edges of the conveyor belt and between which is a pressure chamber into which compressed air is blown. This method provides the additional advantage of simultaneously avoiding soiling of the guide by flakes of tobacco or dust falling into the guide. This is because the air fed into the pressure chamber of the guide leaves it laterally, lifting the belt from the lateral ribs of the guide and blowing away any flakes of tobacco and the dust.

The invention also covers other features which further improve upon the device above and are discussed hereafter.

The special features of the invention and the advantages procured thereby are given with further details in the description of a number of preferred embodiments, illustrated by way of non-restricting examples in the appended drawings, in which.

Figure 1:
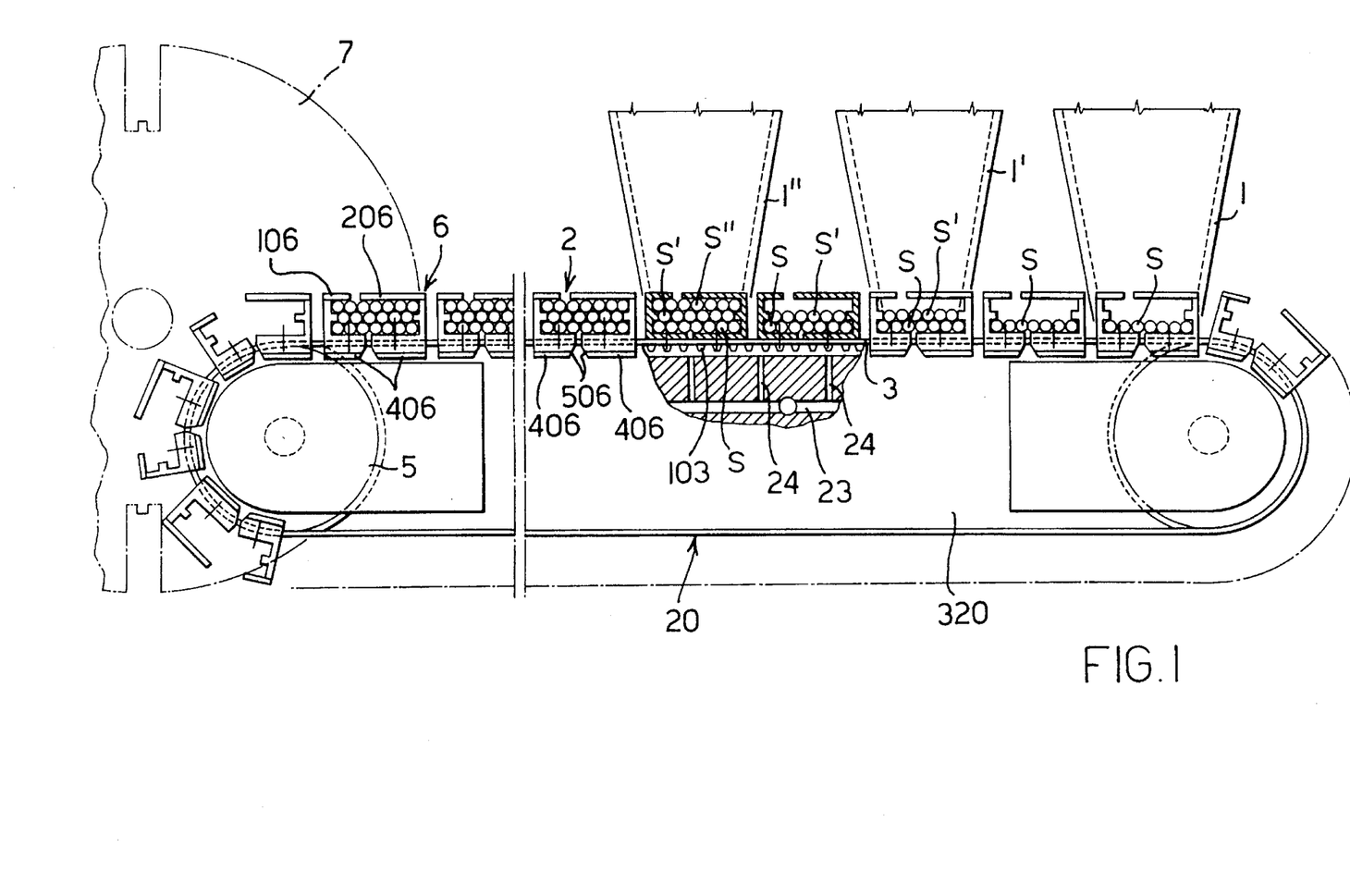
FIG. 1 shows a side view of a conveyor device according to the invention installed in a cigarette packaging machine.

In FIG. 1, a conveyor device according to the invention is illustrated in its application in a cigarette packaging machine and is used for forming ordered groups of cigarettes and for feeding these to subsequent mechanisms which wrap the individual ordered groups of cigarettes in packaging sheets.

The cigarettes are fed loose to the packaging machine, in a feed hopper at the bottom of which are three outlets 1, 1', 1" arranged in line with each other parallel with the direction of advance of the belt conveyor device 2 at predetermined distances. In each outlet 1, 1', 1" there is formed, on a plane parallel with the direction of conveying, and each at a higher level, corresponding approximately to the diameter of the cigarettes, one row of cigarettes S, S', S" made up of a predetermined number of cigarettes lying side by side in the direction of advance of the conveyor device 2 and oriented with their axes perpendicular to the conveying direction.

This conveyor device 2 consists of a continuous conveyor belt 3 that travels around two pulleys 4, 5. The conveyor belt 3 carries on its outer side a plurality of tubular housings 6 which in the example are of approximately rectangular cross section. The conveyor belt 3 is positioned laterally-that is, transversely relative to the direction of advance-with respect to the hopper 1, 1', 1" and the tubular housings 6 are arranged with their axes transversely to the direction of advance and parallel with the axes of the cigarettes. They are distributed at equal intervals along the conveyor belt 3, which is driven in steps whose length is such that the conveyor housings 6 are positioned one after the other in front of the outlets 1, 1', 1" of the feed hopper and to the extraction station in which transfer members indicated by way of example by a wheel 7, feed the individual ordered groups of cigarettes to the other packaging stations of the machine (not shown).

The conveyor belt 3 comprises two straight sides which are relatively long compared with the radii of the pulleys 4, 5. In addition, the radii of said pulleys 4, 5 are approximately of the same order of magnitude as the lengths of the conveyor housings 6 in the direction of advance of the belt 3. On its inner side, the conveyor belt 3 has a central line of teeth 103. The teeth end a predetermined distance from the longitudinal edges of the conveyor belt 3. The line of teeth 103 engages with a toothed wheel 105 of the end pulleys 4, 5.

The conveyor housings 6 are divided into two separate C-shaped parts 106, 206 which complete each other to form the tubular shape, through planes at right angles to the conveyor belt 3 and to its direction of advance. The two parts are slightly separated from each other by an amount less than the dieter of the cigarettes, so as to avoid interference between the cigarettes during their relative angular oscillation when passing around the end pulleys 4, 5.

Each part 106, 206 of a conveyor housing 6 is attached independently to the conveyor belt 3 along a line transverse to the conveyor belt 3 and at an intermediate point of said part 106, 206 relative to its length in the direction of advance. As the housings 6 pass around the end pulleys 4 and 5, they execute a diverging movement like the legs of a pair of compasses of the two parts 106, 206 away from each other, each part 106, 206 keeping its side firmly against the conveyor belt 3 at a tangent to said belt 3 (see FIGS. 1, 4 and 5).

Figure 2:
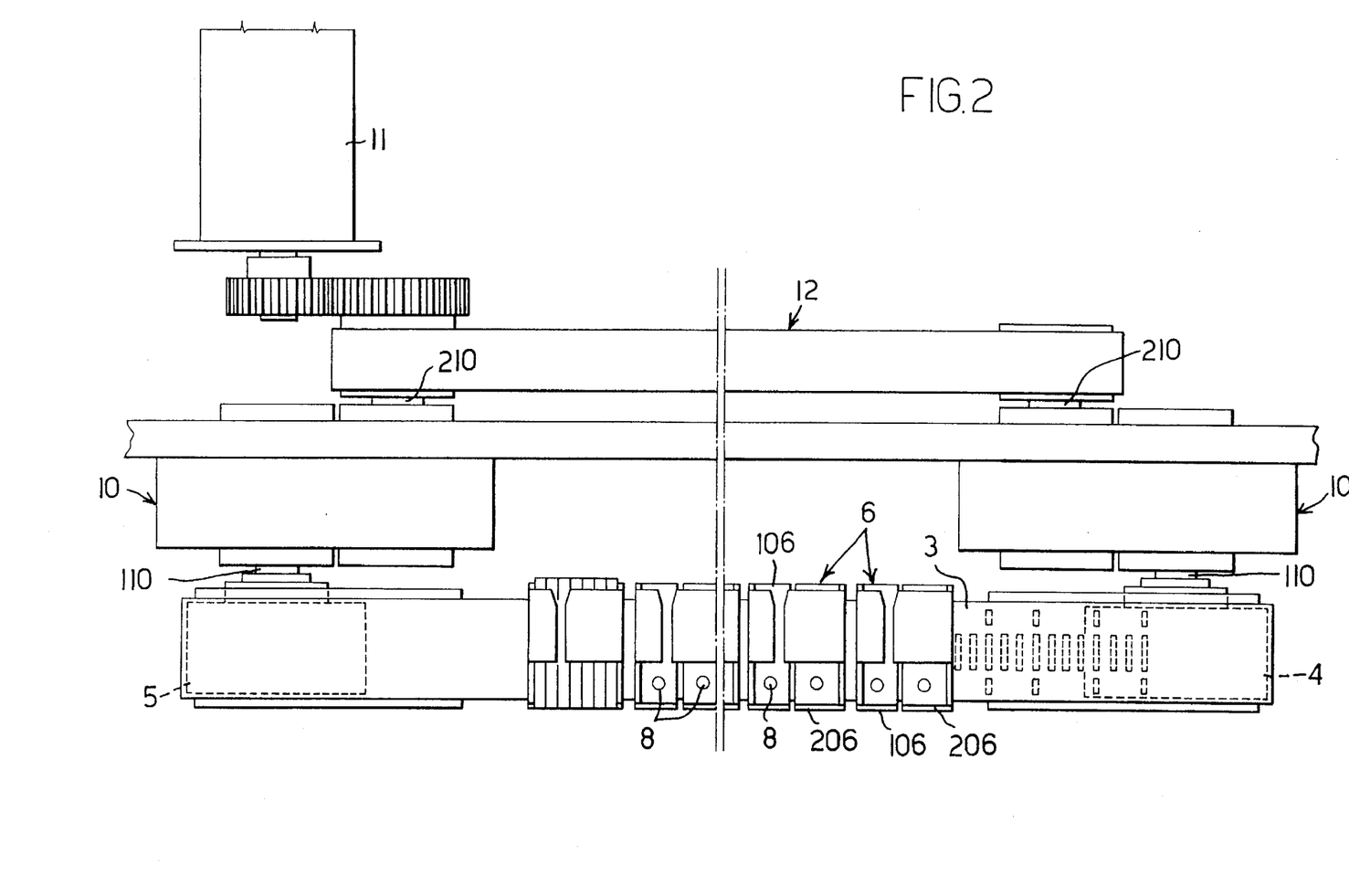
FIG. 2 shows a top view of the conveyor device shown in FIG. 1.
Figure 3:
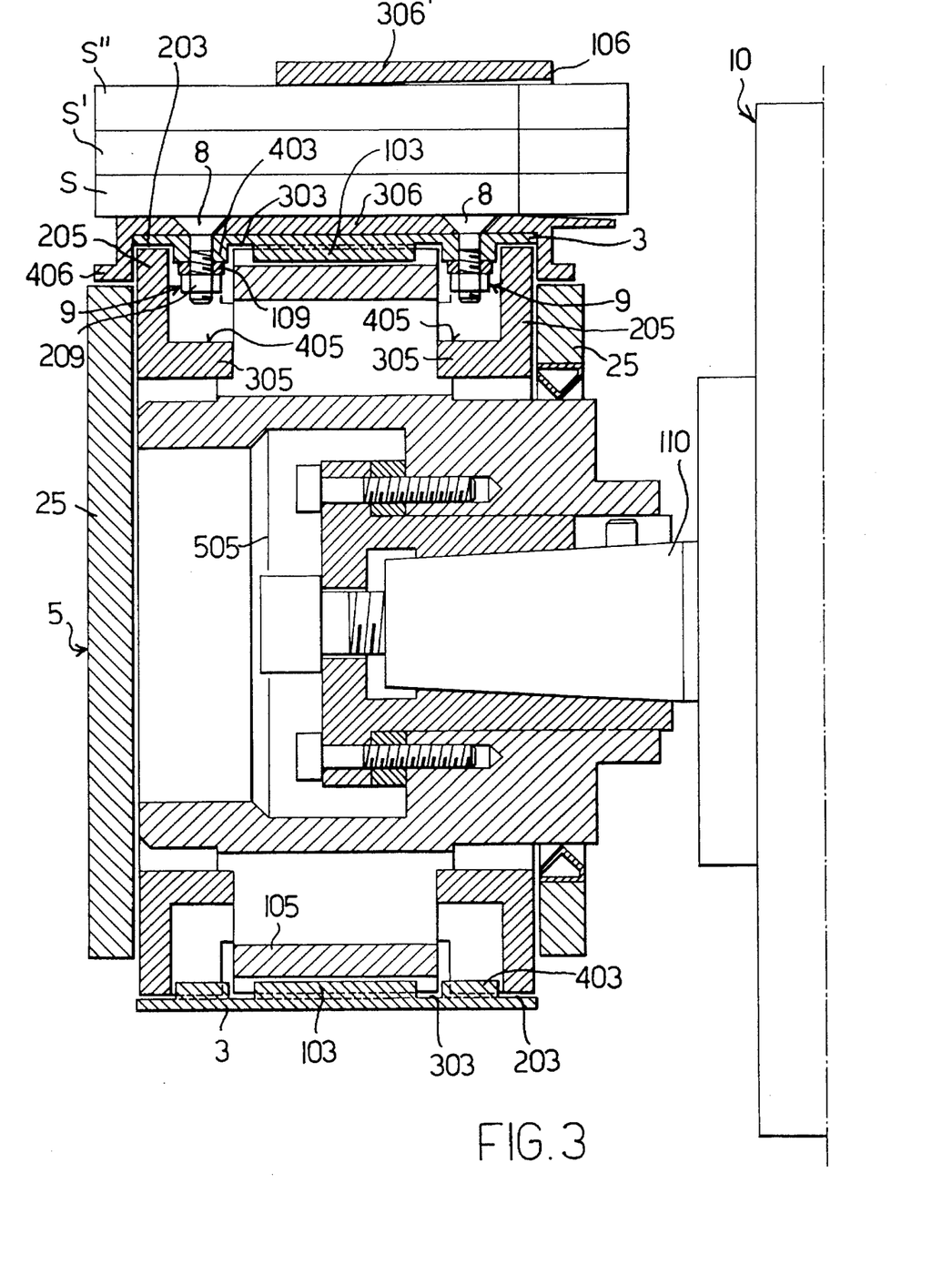
FIG. 3 shows an axial section through one of the end pulleys.
Figures 5, 6:
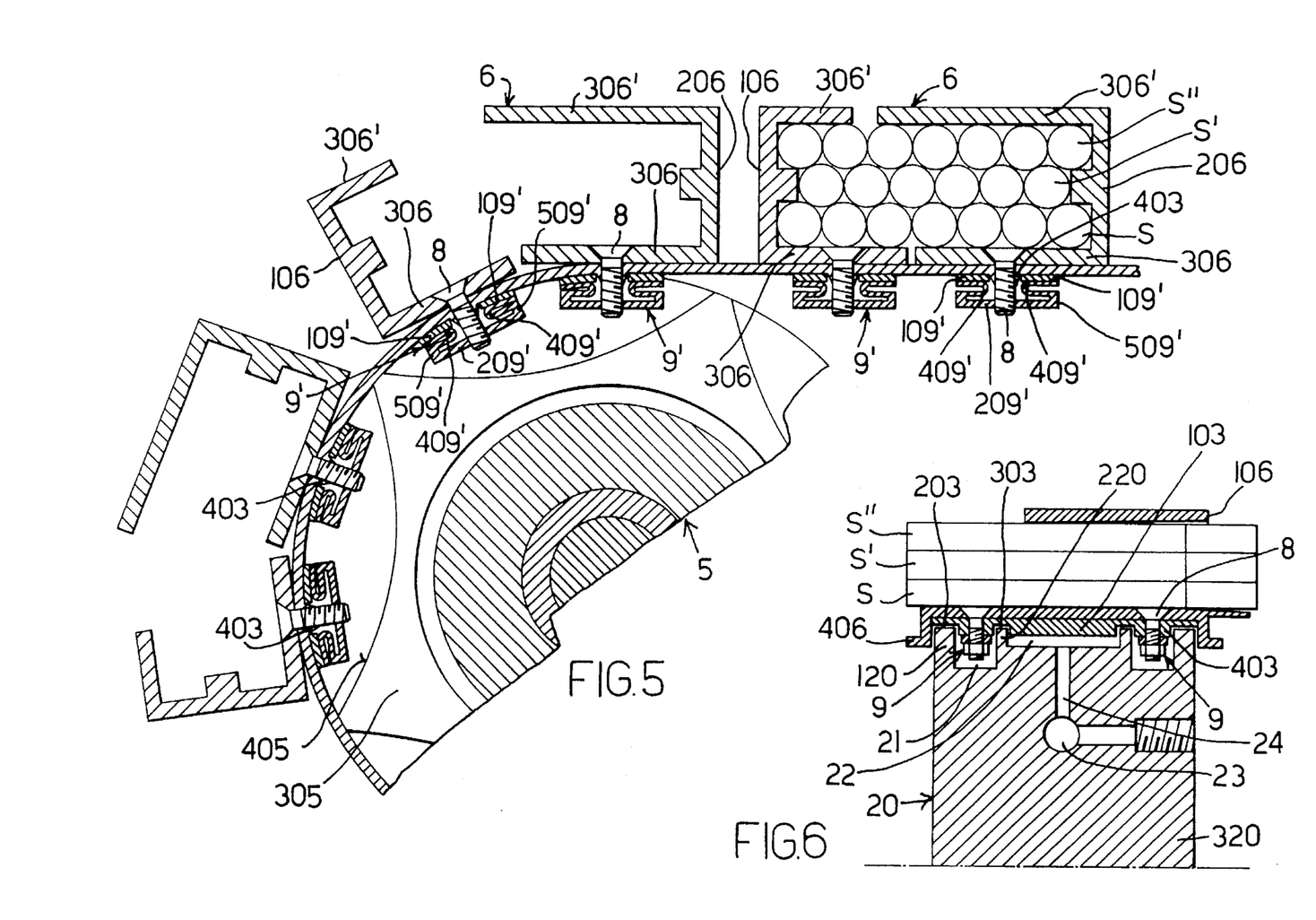
FIG. 5 shows, in a similar way to FIG. 4, an alternative embodiment of the conveyor belt and of the associated housings.
FIG. 6 shows a cross section through the belt running guide and through the conveyor belt itself.

Advantageously, each part 106, 206 of a conveyor housing 6 is attached at only two points aligned on a line transverse to the conveyor belt 3 and, positioned in the two opposite peripheral parts of the belt 3, externally relative to the central line of teeth 103 (FIGS. 2, 3, 6).

This is done with two through screws 8 whose heads are countersunk into the corresponding joining wall 306 of the parts 106, 206 of the housing 6 and with nuts 9 to clamp the joining side 306 of the housing parts 106, 206 to the belt 3. The pairs of clamping screws 8 for each housing part 106, 206 are arranged symmetrically with respect to the central longitudinal axis of the belt and are in line in the direction of advance with the pairs of screws 8 of the parts 106, 206 of the other housings, so as to form two rows of 8 parallel the longitudinal axis of the conveyor belt 3 in an intermediate line between the central line of teeth 103 and the lateral edge of the belt 3, forming two lateral peripheral bands 203 of the conveyor belt 3 that are free and smooth and two similar bands 303 that are free and smooth between the nuts and the corresponding side of the central line of teeth 103.

Figure 4:
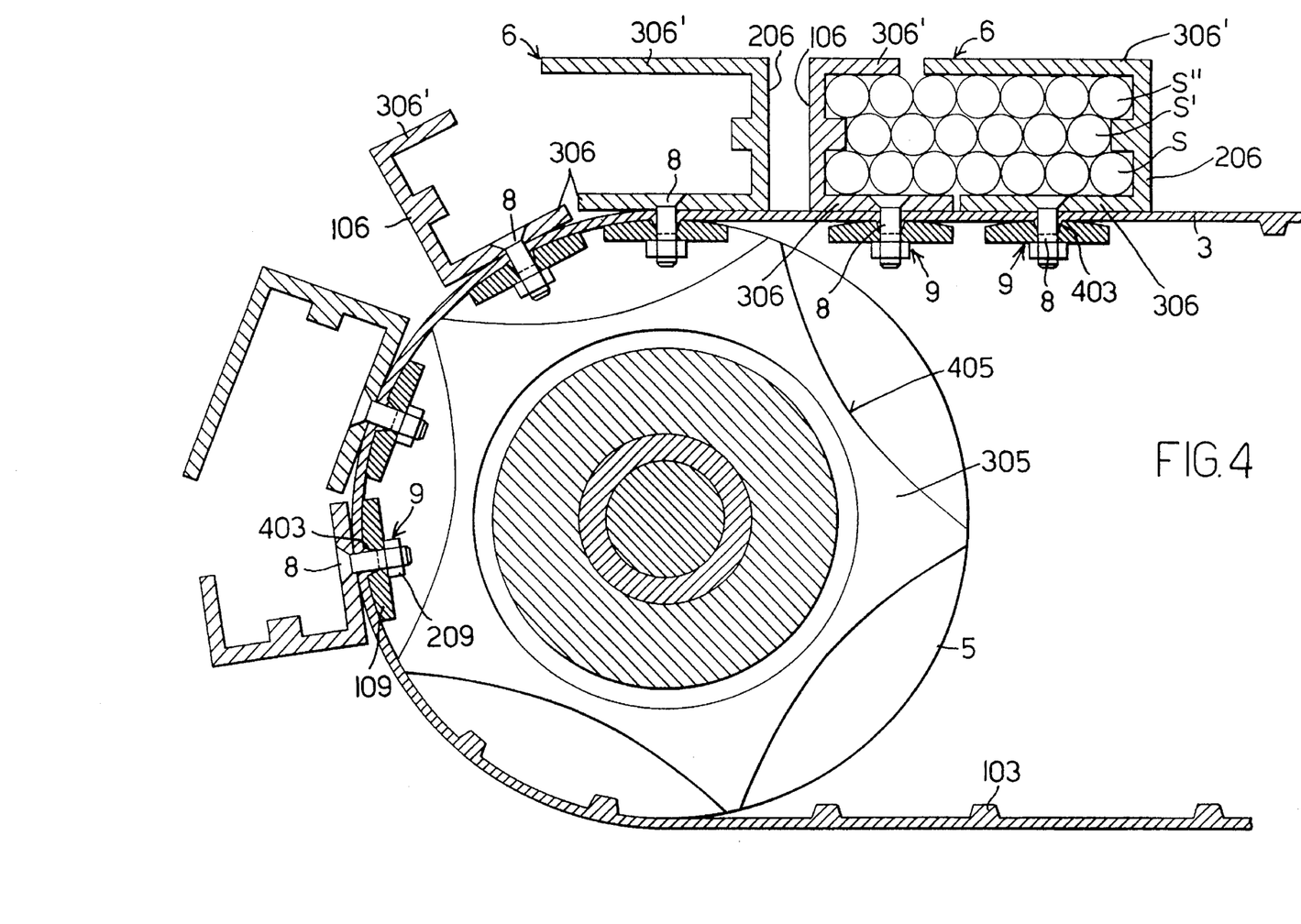
FIG. 4 shows an enlarged detail of a first embodiment of the conveyor belt fitted with tubular housings for the ordered groups of cigarettes, in the region of one of the end pulleys.

The nuts 9 and the conveyor belt 3 possess cooperating centering means 403, 109, 109'. In this example the conveyor belt 3 comprises, on the same side as the nuts 9, a projection of approximately the same shape as the teeth of the central line of teeth 103, being in particular trapezoidal-sectioned in the longitudinal direction of the belt 3, and engaging with a complementary recess in the nut 9. Said projections are advantageously each in line preferably with a tooth of the central line of teeth 103 and are coaxial with the through hole of the screw 8.

in the first example, shown in FIG. 4, the nut 9 is made up of a nut proper or the like 209 and an intermediate plate 109 in which the centering recess is formed. The plate 109 is elongated in the longitudinal direction of the conveyor belt 3 approximately symmetrically with respect to the screw 8 and its width is approximately equal to the transverse dimension of the centering projection 403, so as not to project into the free areas 203, 303. In order to enable the belt to wrap smoothly and correctly around the pulleys 4, 5, that side of the intermediate plate 109 which is nearest the conveyor belt 3 is curved so as approximately to match the radius of curvature of the belt around the pulleys 4, 5. Consequently, on the straight sides of the conveyor belt the intermediate plates 109 are in contact with the conveyor belt 3 only in their center, whereas around the curves their entire length is in contact with the belt 3, allowing it to curve smoothly and increasing the stability of the attachment of the parts 106, 206 to the conveyor belt 3 against possible oscillations thereof.

In the alternative embodiment shown in FIG. 5, the nuts 9 are held against the conveyor belt 3 by means of intermediate elastically deformable, that is compressible, parts. In this example the nut proper is replaced by an engagement plate 209' which is likewise elongated in the longitudinal direction of the belt 3 and in the center of which is a tapped hole for the screw 8. Interposed between each end of the engagement plate 209' and the adjacent wall of the conveyor belt 3 is an elastically compressible part 409' which acts independently of the opposite part. The elastic parts form between themselves a recess in which to engage the centering tooth 403 of the conveyor belt 3 and they press against the belt 3 on the respective side of said centering tooth 403 through another intermediate joining plate 109'. The two plates 109' are integral with their respective elastic parts 409' and are separated from each other by a distance equal to the longitudinal dimensions of the base of the centering tooth 403. In particular, as illustrated in FIG. 5, the elastic parts 409' are both U-shaped springs. The extrados sides of the U-shaped springs are towards the centering tooth 403 and their two arms are attached to or made in one piece with the corresponding end of the engagement plate 209' and with the intermediate plate 109'. Another feature is that the arm of the U-shaped spring nearest the engagement plate 209' does not lie against it but is fixed at its free end to a terminal projection 509' on the corresponding free end of the engagement plate 209'. This construction means that the nut 9' always, even along the straight sections of the conveyor belt 3, presses against the latter, while adapting automatically to the curvature of the conveyor belt 3 as it passes around the end pulleys 4, 5 and therefore allowing the belt 3 to wrap smoothly around said pulleys 4, 5.

Another feature which is not necessary but has some relevance to the processing of cigarettes, and is shown in FIG. 4 and 5, is that the conveyor housings 6 are not divided into two symmetrical parts through a midplane perpendicular to the conveyor belt 3 and to the direction of advance, but through a plane that is basically inclined transversely to the plane defined by the conveyor belt 3. Thus the sides parallel with the conveyor belt 3 of the two parts 106, 206 are of unequal lengths in the direction of advance both as regards either part itself and as regards the two associated parts 106, 206. In the example illustrated, one of the two parts 106 has sides parallel with the conveyor belt whose lengths are different from each other and less than those of the associated parts 206—which are also unequal to each other. Furthermore, the difference between the lengths of the sides 306 in contact with the belt 3 of the two parts 106, 206 is less than the difference between the lengths of the sides 306' furthest from the belt 3. These arrangements ensure that, given the particular arrangement of the cigarettes S, the opposite slots between the two parts 106, 206 are not vertically aligned with each other and do not coincide with the point of maximum projection of the cigarette, which would put at risk the stability of the arrangement of cigarettes in the housing 6.

With reference to FIGS. 2, 3, the end pulleys 4, 5 are both driven in rotary steps that are synchronized together and of equal angular amplitude.

Each pulley 4, 5 is mounted on a mounting 505 so as to rotate together with the output shaft 110 of an intermittent drive or intermittent-motion device 10. Said intermittent-motion devices 10 are known and comprise a positive-drive cam turned continuously by the motor 11 acting through a belt drive 12 which engages dynamically with the input shafts 210 connected operationally to the cam, while the rollers that follow the cam are connected operationally and turn the output shaft 110 in such a way that it executes rotations of predetermined angular amplitude as a function of a predetermined angle of rotation or a number of revolutions of the input shaft 210.

Another feature shown in FIGS. 1 to 6 is that the conveyor belt 3 is guided for the whole of its longitudinal dimension along a continuous stationary guide 20. Said guide also extends around the curved portions of the end pulleys 4, 5. The guide 20 comprises a rib 120 perpendicular to the conveyor belt 3 along each free lateral peripheral band 203 of the conveyor belt 3, and this rib 120 is positioned externally relative to the centering teeth 403. The guides 20 may advantageously be provided, as shown in particular in FIG. 6, with another rib 220 also along the free conveyor belt 3 band 303 intermediate between the central line of teeth 103 and the centering teeth 403.

The ribs 120 and 220 laterally define a running track 21, 22 for the nuts 9, 9' used to clamp the housings 6 on the conveyor belt 3 and for the central line of teeth 103. Advantageously, the straight parts of the guide 20 consist of a beam 320 at whose ends are the driven end pulleys 4, 5 and in which are formed the ribs 120, 220 and the running tracks 21, 22, for the nuts 9, 9' and for the central line of teeth 103. As can be seen in FIG. 3, around the end pulleys 4, 5 only the outer lateral ribs 120 are provided, here taking the form of two discs 205 mounted so as to rotate with, and on either side of, the toothed wheel 105. The running tracks for the nuts also continue around the end pulleys 4, 5. In this case the discs 205 may have on the side of attachment to the toothed wheel 105 an axial extension 305 of smaller diameter equal to the depth of said tracks 21 for the nuts 9, 9'. In particular, as shown in FIGS. 4 and 5, the axial extension 305 comprises a plurality of flattenings or recesses 405 giving it the approximate shape in plan view of a polygon inscribed in the circumference of the disc 205. The number of sides of the polygon depends on the dimensions of the end pulleys 4, 5 and of the conveyor housings 6, with everything synchronized so that the nuts 9, 9' of each conveyor housing 6 coincide with said flattenings or recesses 405. In particular the flattenings 405, that is the sides of the polygonal axial extension 305 of the discs 205, are made concave. In the example illustrated, the axial extension 305 is pentagonal with concave sides.

With particular reference to FIGS. 1, 3 and 6, the conveyor belt 3 is guided on an air cushion. The air is fed through a manifold duct 23 running parallel with the guide 20, and in particular with the latter's straight portion, in a central chamber which, in the practical example illustrated, coincides with the running track 22 for the central line of teeth 103 of the conveyor belt. The manifold duct 23 runs underneath said running track 22 in the midplane perpendicular to the track and feeds into said running track 22 through a plurality of transverse ducts 24 set out at equal intervals along the said running track 22. The compressed air keeps the belt slightly off the guide ribs 120, 220 and flows out laterally between the conveyor belt 3 and the guide 20, expelling flakes of tobacco and dust from the guide 20 and/or preventing them from entering.

Another feature of the conveyor device is that it is provided with additional lateral guide means cooperating with the sides of the guide 20. In this example, as visible in FIGS. 1, 2, 3 and 6, the side in contact with the conveyor belt 3 of each part 106, 206 of a conveyor housing 6 comprises transverse continuation flanges 406 on its ends that come to the lateral edges of the conveyor belt 3. These continuation flanges 406 project past the inner side of the conveyor belt 3 and are superimposed over its lateral edge and over the lateral sides of the guide 20, specifically over the latter's outer ribs 120. Around the end pulleys 4, 5 the continuation flanges 406 are passed around a stationary plate 25 which covers them and is attached to the corresponding side of the straight part of the guide 20, specifically at the ends of the beam 320. Advantageously, as shown in FIG. 1, the continuation flanges 406 joined on to the two complementary parts 106, 206 of a conveyor housing 6 are rounded or tapered off at the opposing free corners 506 so that the said two parts 106, 206 can always diverge when passing around the end pulleys 4, 5.

We claim:

1. Belt conveyor device for groups of delicate rod-shaped objects, which device comprises:

a continuous conveyor belt travelling around pulleys, at least one of which is driven, a plurality of discrete conveyor housings attached to an outer face of the conveyor belt, each conveyor housing being used for one group of delicate rod-shaped objects, which said housings are equidistant from each other and carried stepwise in succession from a loading station to an unloading station, these stations being situated near two opposite ends of the conveyor belt, characterized in that each discrete conveyor housing consists of two separate and mutually complementary housing parts divided at at least one plane transverse to the plane defined by the conveyor belt and transverse to the direction of advance of the conveyor belt, each housing part being C-shaped, the C-shape defining a top side, a joining side, a connecting side connecting the top and joining sides, and an opening opposite the connecting side such that the openings of associated complementary housing parts face one another to form the discrete conveyor housing, and an attaching means for attaching each joining side of each housing part separately and firmly to the conveyor belt independently of the associated complementary housing part.

2. Device according to claim 1, characterized in that both pulleys are driven stepwise, synchronized with each other, by a common motor.

3. Device according to claim 1, characterized in that the conveyor belt is made to run along an air cushion guide extending at least along one of two straight sides of the conveyor belt between the pulleys.

4. Device according to claim 1, characterized in that each joining side of each housing part is attached to the conveyor belt along a single line transverse to the conveyor belt and longitudinally intermediate of said joining side of the housing part.

5. Device according to claim 4, characterized in that the joining side of each housing part of a conveyor housing is attached at only two respective points of said transverse line of attachment to the conveyor belt, which respective points are located in, respective peripheral lateral bands of the conveyor belt and symmetrically with respect to a central longitudinal axis of the conveyor belt.

6. Device according to claim 5, characterized in that the respective points of attachment of each respective joining side of all the housing parts attached to the conveyor belt are in line with each other parallel to the longitudinal axis of the conveyor belt.

7. Device according to claim 5, characterized in that said joining side is clamped against the conveyor belt by associated through screws and nuts, the head of the screw being countersunk into said joining side and the nut being engaged on the end of the screw protecting from an inner side of the conveyor belt.

8. Device according to claim 4, characterized in that the attaching means allows the conveyor belt to curve around a radius of the pulleys.

9. Device according to claim 7, characterized in that the nuts are curved on the sides that meet an inner face of the conveyor belt so as approximately to match a radius of curvature of said conveyor belt around the pulleys.

10. Device according to claim 7, characterized in that the nuts are elastically deformable in order to curve so as approximately to match a radius of curvature of the conveyor belt around the pulleys.

11. Device according to claim 9, characterized in that each nut comprises a nut proper and an intermediate plate which is elongated in the longitudinal direction of the conveyor belt and symmetrically with respect to the associated screw, a side of said intermediate plate engaging the inner face of the conveyor belt being curved so as to match the radius of curvature of the belt around the pulleys.

12. Device according to claim 10, characterized in that each nut consists of an engagement plate which is elongated in the longitudinal direction of the conveyor belt and has a tapped hole for engagement with the associated screw in its middle, while free ends of said engagement plate press against the inner face of the conveyor belt with mutually independent elastically compressible parts.

13. Device according to claim 12, characterized in that the elastically compressible parts are U-shaped springs whose extrados sides are towards the associated screw and which press towards the inner face of the conveyor belt against an additional intermediate plate.

14. Device according to claim 1, further including a centering means for mutual centering of the conveyor belt and the housings.

15. Device according to claim 14, wherein the joining sides of the housing parts are clamped to the conveyor belt by associated through screws and nuts; and wherein said centering means is characterized in that on an inner face of the conveyor belt, at the locations of the screws and coaxially with the screws, the conveyor belt has centering teeth that engage in complementary recesses in the nuts, said centering teeth being trapezoidal in section in the longitudinal direction of the conveyor belt.

16. Device according to claim 15, characterized in that the housing parts of the conveyor housings comprise transverse continuation flanges which are superimposed from the exterior over a lateral peripheral edge of the conveyor belt.

17. Device according to claim 16, characterized in that the conveyor belt comprises a central line of teeth on an inner side thereof by which the conveyor belt engages with toothed wheels on the pulleys, said central line of teeth being located between two longitudinal rows of points of attachment of the conveyor housings, while each centering tooth is laterally aligned with a corresponding tooth of the central line of teeth and is separated by a gap from an opposing narrow end of the corresponding tooth of the central line of teeth.

18. Device according to claim 17, characterized in that at least along straight sides of the conveyor belt between the pulleys there is a guide for the conveyor belt which is stationary and which comprises lateral ribs which support the conveyor belt and coincide with edges of the conveyor belt externally relative to the rows of centering teeth and these ribs define longitudinal running tracks for the nuts that clamp the conveyor housings to the conveyor belt and for the central line of teeth of the conveyor belt.

19. Device according to claim 18, characterized in that fitting in an intermediate portion of the conveyor belt between rows of the centering teeth and the central line of teeth, the guide comprises two more lateral ribs which separate the longitudinal running tracks for the nuts from a central longitudinal running track for the central line of teeth of the conveyor belt.

20. Device according to claim 19, characterized in that the guide comprises a pressure chamber open towards the conveyor belt, with which said pressure chamber there communicates by a plurality of ducts distributed along a length of said pressure chamber a manifold duct located within the guide parallel with said pressure chamber and connected to a source of compressed air, said pressure chamber being formed by the running track of the central line of teeth of the conveyor belt.

21. Device according to claim 18, characterized in that the guide also extends around the pulleys.

22. Device according to claim 21, characterized in that the lateral ribs and the running tracks of the nuts also extend around the pulleys and at each pulley consist of a disc rotating together with the pulley and having on a side nearest a corresponding face of each pulley an axial extension of smaller diameter than the disk and approximately equal to the depth of the running tracks for the nuts.

23. Device according to claim 22, characterized in that the axial extension comprises a plurality of recesses of identical angular amplitude and so designed that as the pulleys rotate, the pulleys coincide with and are synchronized with the conveyor housings passing in succession around the associated pulley.

24. Device according to claim 23, characterized in that the recesses of the axial extension take the form of flattenings giving the axial extension a form, in plan view, like a regular coaxial polygon inscribed in the disc, said flattenings being concave.

25. Device according to claim 24, characterized in that it includes a drive motor which is connected dynamically by a drive to both pulleys in order to drive the pulleys in synchronized steps.

26. Device according to claim 25, characterized in that the pulleys are mounted on output shafts of intermittent-motion devices whose input shafts are driven by the common motor.

27. Device according to claim 1, characterized in that said device is used in a cigarette packaging machine, the conveyor housings being rectangular tubes oriented with longitudinal axes perpendicular to the direction of advance, while the top and joining sides of the C-shaped housing parts are constructed with lengths in the longitudinal direction of the conveyor belt that are different from each other for each respective C-shaped housing part and different from a complementary top and joining side for leading and trailing said housing parts of each conveyor housing, and also such that between the trailing and leading housing parts of a conveyor housing lateral slots are formed between said top sides and said joining sides, said slots being staggered in the direction of advance of the conveyor belt and lying between lines of greatest projection of two adjacent cigarettes of a layer of cigarettes lying directly against the corresponding top or joining side.

* * * * *